US006555823B2

(12) United States Patent
Kuhns et al.

(10) Patent No.: US 6,555,823 B2
(45) Date of Patent: Apr. 29, 2003

(54) ENERGY COLLECTION INSTRUMENT AND METHOD OF USE

(75) Inventors: David W. Kuhns, Minneapolis, MN (US); Thomas M. Clausen, Minneapolis, MN (US); Shawn W. Lee, Vadnais Heights, MN (US); Steven R. Vanhoose, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/746,884

(22) Filed: Dec. 22, 2000

(65) Prior Publication Data

US 2002/0079431 A1 Jun. 27, 2002

(51) Int. Cl.[7] .................................................. G01J 1/42
(52) U.S. Cl. ...................... 250/372; 250/216; 250/221; 250/227.11; 250/492.1
(58) Field of Search ............................ 250/203.4, 216, 250/221, 227.11, 227.21, 372, 492.1; 244/173; 385/88, 91, 92, 93, 94

(56) References Cited

U.S. PATENT DOCUMENTS

| | | | |
|---|---|---|---|
| 3,502,890 A | | 3/1970 | Hedelman ................... 250/228 |
| 3,743,844 A | | 7/1973 | Kraty ......................... 250/334 |
| 4,435,092 A | | 3/1984 | Iuchi .......................... 374/129 |
| 5,259,056 A | * | 11/1993 | Davenport et al. ......... 385/115 |
| 5,418,369 A | * | 5/1995 | Moore et al. .............. 250/372 |
| 5,424,547 A | * | 6/1995 | Stark et al. ................ 250/372 |
| 5,754,622 A | * | 5/1998 | Hughes ....................... 378/65 |
| 6,023,066 A | | 2/2000 | Cain et al. ................. 250/372 |
| 6,081,638 A | * | 6/2000 | Zhou ........................... 385/31 |
| 6,201,250 B1 | * | 3/2001 | Morlock ..................... 250/372 |

FOREIGN PATENT DOCUMENTS

GB 2278434 11/1994

OTHER PUBLICATIONS

UVPS Facsimile from Stephen Siegel to Frank Aquirre, May 31, 2000, pp 1–7.
"On–Line Monitoring System", UV Applications Development Dept., Apr. 6, 2000, pp 1–5.
"Control Systems for the Operation of UV Lamps", by Beying, pp 117–119, publically available at least after Dec. 1, 2000.
"MULTIBRITE® 4 Channel UV Monitoring System", by MULTIBRITE*EIT Inc., Apr. 6, 2000, pp 1–5.
"LM–9000™UV Lamp Monitor", by UVPS, Inc., 1997, pp 1–5.
"A UV Lamp Spectral Measuring Multi–Point On–Line Monitoring System for Radiation Cured Processes", by Andrew Ridyard, 1998, pp 1–17.

* cited by examiner

Primary Examiner—Robert H. Kim
Assistant Examiner—Allen C. Ho
(74) Attorney, Agent, or Firm—Brian E. Szymanski; George W. Jonas

(57) ABSTRACT

The invention is a pneumatically actuated energy collection device. The device includes a support which has an energy collector thereon. A shutter is slidably attached to the support and can be moved between a first "closed" position and a second "open" position. In its first position, the shutter covers the collector and in its second position, the shutter uncovers the collector. The shutter is biased into one of the positions. A chamber is disposed adjacent to the shutter so that when the chamber is pressurized, the shutter bias is overcome and the shutter is moved between the first position and the second position.

23 Claims, 5 Drawing Sheets

Fig. 3A

ENERGY COLLECTION INSTRUMENT AND METHOD OF USE

CROSS-REFERENCE TO RELATED APPLICATION(S)

None.

BACKGROUND OF THE INVENTION

The invention is a radiant energy collection instrument. More specifically, the invention is a fiber optic sensor using a pneumatically driven shutter to shield the sensor.

Chemical processing systems using radiant energy sources are known in many industrial processes. These chemical processing systems typically use ultraviolet (UV) lamps or bulbs placed near a product in a manufacturing line to cause chemical reactions to occur in or on the product. Often these chemical reactions are referred to as curing or in some industries as drying. The wavelengths of radiant energy radiated by UV lamps (in the visible and non-visible spectrum) have been found to be particularly effective in transferring energy to the product to effect the desired chemical changes.

The wavelengths radiated onto the product typically range from approximately 2.5 micrometers to approximately 190 Nanometers. The product being processed by the system can be almost anything, but typically it is a "web" of paper, plastic, or paper-like material (e.g., paperboard). The "web" comprises a continuous stream of material fed through a series of rollers. Radiant energy sources (typically more than one lamp or bulb) are placed at various points along the web to radiate energy onto the web. Coatings on the surface of the web, or the web material itself is caused to undergo a chemical change during this process. In this manner the coatings on the web (e.g., ink, lacquer, or adhesives) or the web itself is cured.

Unfortunately, the performance of an individual UV energy lamp can vary over its lifetime. A newer lamp may radiate energy more intensely than when it is older. Additionally, individual lamps with the same specifications can perform differently. Specifically, different wavelengths may be emitted more intensely from one lamp to the next. As would be expected, as a lamp grows older, its performance typically declines until it ultimately fails. The power provided to the lamp can also affect the lamp performance. If the electrical service to the lamp fluctuates, specific wavelengths produced by the lamp may vary in intensity. Differences in air temperature surrounding the lamp as well as the time it takes for the lamp to warm up may also cause fluctuations in wavelength intensity. All these variances in the intensity of the radiant energy emitted by the lamp can cause the level of drying and curing of the web to vary. Therefore, in order to optimize the process and provide consistent product it is necessary to monitor the amount of radiant energy emitted by the lamp in order to assure that proper drying and curing time is provided to the web.

To measure the amount or "dose" of radiant energy impinging on the web, a detection system is needed. In the past, many methods of measuring this amount of radiant energy have been used. One previous method to evaluate whether the energy lamps were providing adequate radiant energy was to test the web downstream from the lamp. Although this gave a very accurate measurement of whether the web had been properly cured, the measurement took place too late in the process, since product which had not been properly cured could not be used and was wasted and discarded.

An alternate measurement method was to use electronic devices such as "light pucks" (known in the art) placed on the web and moved with the web between the lamp and the web to provide a test measurement of the amount of radiant energy being emitted by the lamps. While this method gave a more direct measurement of lamp performance, it was performed during setup and not during actual production so that no information was being gathered as to energy impinging the web during the actual run time process. In particular, no measurements of variances in the radiant energy impinging the web were able to be taken. Once again, improperly cured product resulted.

To avoid this waste of product, a second method was developed which monitored the energy draw of the power supply for each lamp, in an attempt to provide a "real time" measurement of the actual energy used by the lamp. This measurement was a very rough and inaccurate way to estimate the amount of radiant energy emitted by the lamp and impinging on the web on a continuous basis. Although inaccurate, this method was an attempt to determine how much radiant energy was impinging onto the web in "real time". Measuring the radiant energy in "real time" made it possible to more accurately control the curing time of the web (e.g., by changing the pace of the web through the process to provide longer or shorter drying time) and reduce loss of product. Unfortunately, many factors made the measurement of the energy drawn from the lamp an inaccurate measurement of the radiant energy impinging the web defeating any advantages gained by the real time measurements. For example, as the lights themselves degraded due to aging, the amount of energy drawn by the lamp could change relative to the amount of radiation emitted. Additionally, the radiation emitted for a specific amount of power drawn varied from lamp to lamp. To alleviate these problems, electronic detection devices were placed around the lamp to measure the direct output of radiant energy emitted from the lamp. However, the environmental conditions surrounding the process (e.g., high humidity, high temperature, RF radiation, and foreign objects such as airborne adhesive, lacquer, etc.) often caused the electronics in the detectors to break down and malfunction.

Finally, remote collection devices have been developed which allow the radiant energy emitted by the lamp to be collected and transported (typically by fiber optic cables) to a detection device placed remotely from the hostile environment surrounding the web. These devices were placed on the back side of the lamp (opposite the web), allowing a direct measurement of the amount of radiant energy emitted by the lamp to be taken. This placement of these devices on the opposite side of the lamp from the web was done for two main reasons: first there was very little space between the web and the lamp and second because the most hostile environment in the process is directly between the web stream and the surface of the lamp housing. The space between the web and the lamp was small in order to keep contaminants such as oxygen (which can affect curing of the web in some processes) to a minimum, as well as assuring that a maximum amount of radiant energy from the lamps impinged the web. The environment is extremely hostile at this positioning since it is most directly in contact with the radiation and heat from the lamp as well as the adhesive and airborne contaminants from the web.

While remote collection devices solved some of the problems described above, they still did not deliver accurate measurements of radiant energy intensity impinging the web. Typically, a transparent cover is placed over the lamp in order to protect the lamp elements from airborne contaminants. This transparent cover becomes clouded over time (due to airborne contaminants) which prevents a portion of the radiant energy emitted by the lamp from impinging upon the web. Thus, collection devices placed at the back of the lamp do not see this degradation, and an accurate measurement of energy radiated onto the web cannot be attained.

As discussed, due to the small physical space between the lamp and the web, it has been problematic to place a sensor between the web and the lamp which can withstand the hostile environment of intense heat and floating contaminants. Sensors which use protective covers are too bulky to be positioned between the lamp and the web. Collection devices which are small enough to be placed in the required position do not have protective covers and quickly degrade due to the airborne contaminants and high radiation surrounding the web. Additionally, sensors which contain electronic actuation components quickly degrade due to the high heat, radiation and humidity.

BRIEF SUMMARY OF THE INVENTION

The invention is a pneumatically actuated energy collection device. The device includes a support which has an energy collector. A shutter is slidably attached to the support and can be positioned in a first position and a second position. Placing the shutter in the first position disposes the shutter so that it covers the collector. Placing the shutter in the second position disposes the shutter so that it does not cover the collector. The shutter is biased into one of the positions. A chamber is disposed next to the shutter so that when the chamber is pressurized, the pressurization overcomes the shutter bias and moves the shutter between the first position and the second position.

In one preferred embodiment of the energy collection device, when the shutter is placed in the second position, a curtain of pressurized air blows across the collector.

While the above-identified drawing figures set forth one preferred embodiment of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principle of the invention.

DETAILED DESCRIPTION

Figure 1:
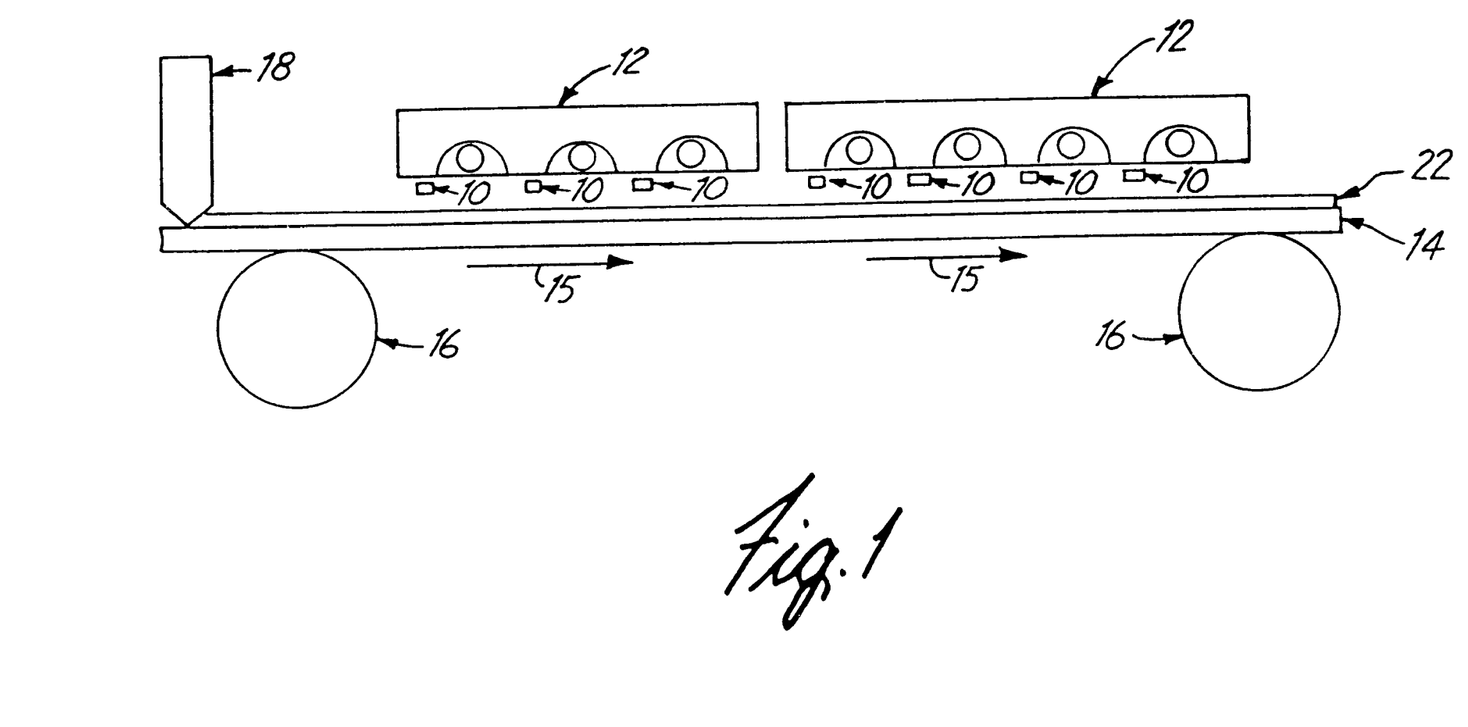
FIG. 1 is a schematic illustration showing the inventive energy collection device used in a curing process.

Inventive energy collection devices 10 are shown in an exemplary industrial process in FIG. 1. Each energy collection device 10 is mounted adjacent to an ultraviolet (UV) lamp 12 (either a single bulb or multiple bulbs) so as to be disposed between the UV lamp 12 and a continuously streaming web 14 (typically a paper or polymer based material). The web 14 is advanced in direction 15 (see arrows in FIG. 1) using rollers 16 and under a die 18 which extrudes (coats) an adhesive layer 22 (or other coating such as ink, lacquer, etc.) onto the web 14. The web 14 and adhesive layer 22 thereon are heated and the adhesive is cured by radiant energy emitted from the lamps 12 as the web 14 proceeds between rollers 16 (or other web support structure) in front of the lamps 12. The energy collection device 10 is disposed so as to collect a portion of radiant energy being directed from each lamp 12 towards the web 14. Thus, the energy collection device 10 is exposed to the actual radiant energy seen by the web 14, thereby alleviating the energy detection problems experienced with past collection devices. It should be noted that this process configuration is only exemplary of processes in which the inventive energy collection devices 10 may be used. A person skilled in the art would realize that the inventive energy collection devices 10 could be used in any number of processes where it is desirable to collect radiant energy. For example, the energy collecting devices 10 may be used in a printing process where radiant energy is used to dry ink applied to a substrate.

Figure 2:
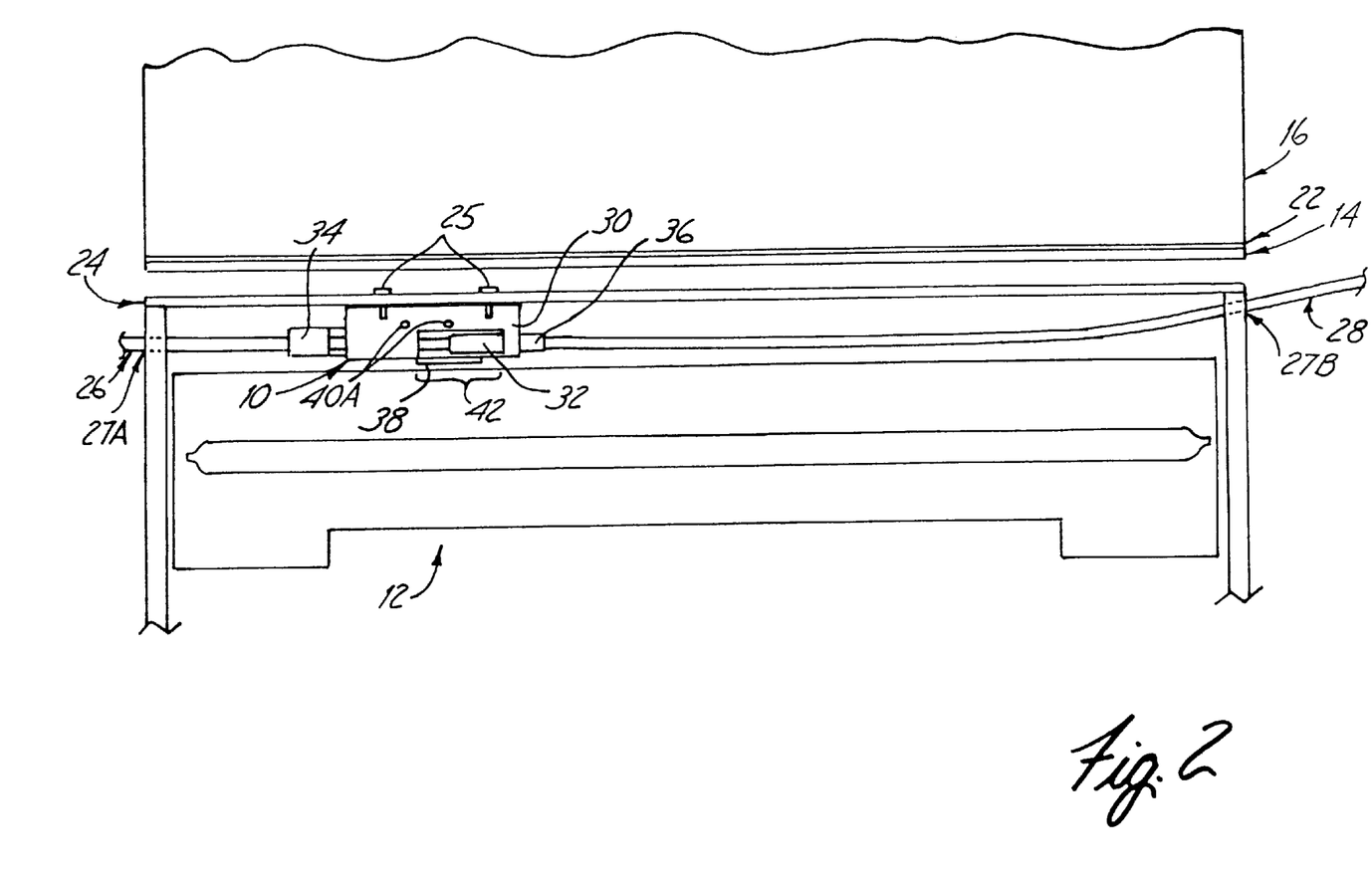
FIG. 2 is an elevational view of the inventive energy collection device mounted adjacent an ultraviolet heating lamp.

The inventive energy collection device 10 is shown mounted to one ultraviolet lamp assembly 12 in FIG. 2. In this embodiment, the energy collection device 10 is secured to a mounting bracket 24. Mounting the energy collection device 10 in this manner allows it to be positioned anywhere along the body of the lamp assembly 12 using mounting screws 25 or other mounting methods know in the art.

The collection device 10 includes no electronic components, instead a pressurized gas feed is used to operate the device 10. Accordingly, a pressurized nitrogen line 26 extends through aperture 27A of the lamp assembly 12 to the collection device 10. The nitrogen line 26 provides compressed nitrogen (preferably at approximately 3 to 100 psi) to the energy collection device 10. It should be noted that using compressed nitrogen is exemplary, and any compressed gas may be fed to the energy collection device 10 (e.g., air). In the inventive collection device 10, once energy has been collected, it is carried away from the detector for further analysis by a fiber optic cable. Accordingly, a fiber optic cable 28 extends through aperture 27B in the ultraviolet lamp assembly 12 and attached to the energy collection device 10. In FIG. 2, the energy collection device 10 is illustrated in a first closed position.

Figure 3:
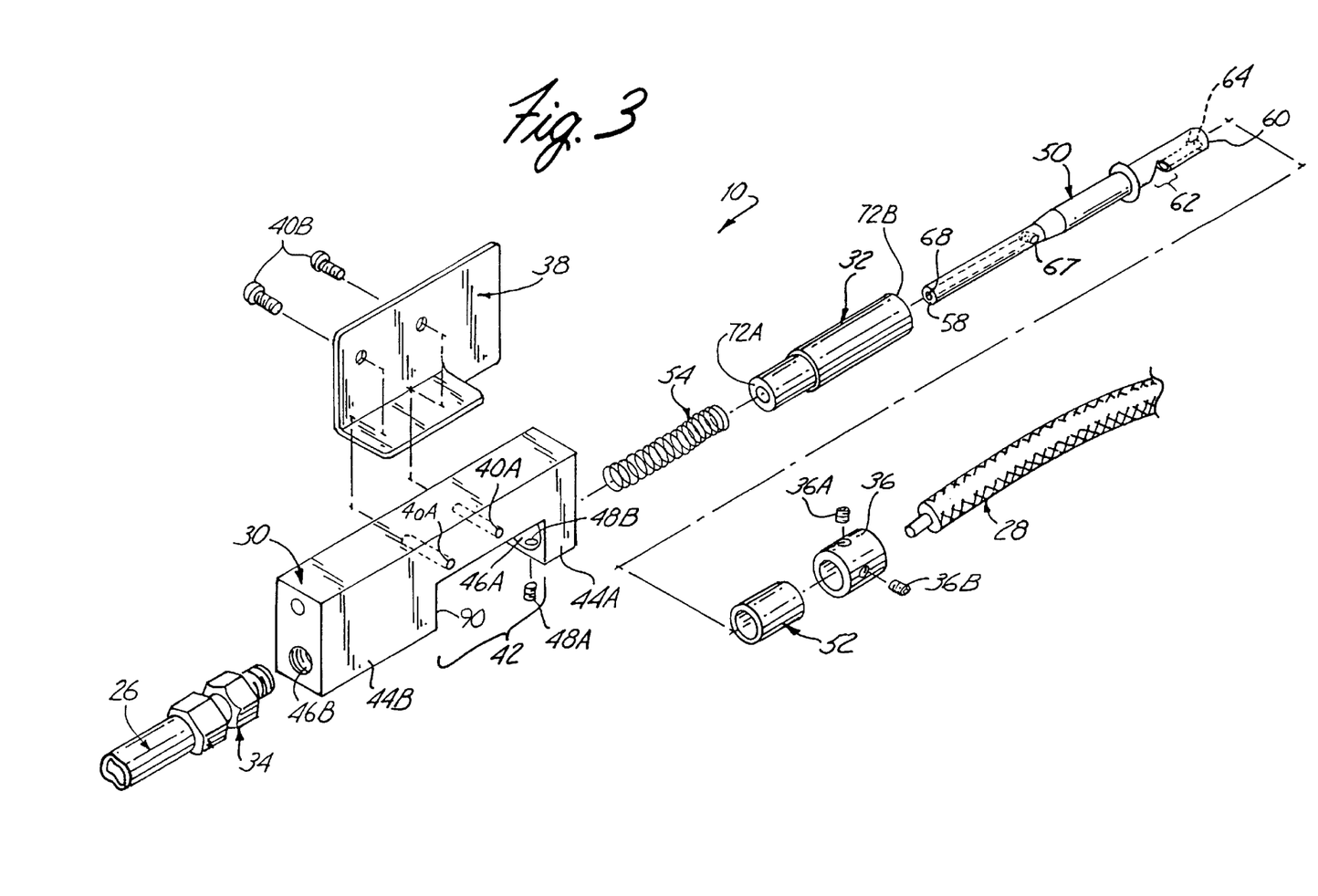
FIG. 3 is an exploded perspective view of a preferred embodiment of the inventive energy collection device.

As shown in FIG. 3, each energy collection device 10 includes a mounting body 30, a generally tubular shutter 32, a pneumatic fitting 34, a fiber optic mount 36, and a guard 38. The body 30 typically includes mounting holes 40A which are preferably disposed on both sides of the body 30 and cavity 42. The cavity portion 42 is typically milled from the body so as to extend completely through the body 30 (from the side-to-side) of the light collection device 10. The guard 38 is mounted on one side of the body 30 using guard screws 40B inserted into the mounting holes 40A. The guard 38 acts to block one side of the cavity 42. This versatility in mounting the guard 38 allows the energy collection device 10 to be mounted in a variety of positions with respect to the lamp assembly 12 while still providing protection against impact from foreign objects. When mounted, the guard 38 is disposed on the opposite side of the body 30 from which the radiant energy is being collected. A person skilled in the art would realize that although the guard 38 is desirable, the scope of the invention is not exceeded if the guard is not provided.

The preferred maximum length, width, and depth dimensions of the body 30 are approximately 3.375 inch by 1 inch by 0.5 inch or less, respectively. Preferably, the overall dimensions of the energy collection device 10 (including the guard 38, the fiber optic mount 36 and the pneumatic fitting 34) are less than 4.25 inches by 1.25 inches by 0.625 inch, which may also be read as 4-¼ inches by 1-¼ inches by ⅝ inches (i.e., length, width and depth dimensions). While these dimensions reflect the size of the preferred embodiment due to ease of the manufacture, the device 10 may be made smaller if the process so requires. Maintaining a smallest overall dimension of 0.625 inch or less allows the device 10 to be mounted in minimal space between the web 14 and the lamps 12 (see FIG. 1). In many processes, it is necessary to keep the distance between the web 14 and the lamps 12 to a minimum to assure that the maximum amount of radiant energy from the lamps 12 impinges the web 14 as well as assuring that contaminants entering this space do not affect the web 14. Contaminants may include oxygen which can adversely affect the curing process. By keeping this distance small, the area between the web 14 and the lamps 12 can be efficiently flooded with inert gas (such as nitrogen), maintaining the integrity of the process. It should be noted that although specific dimensions of the inventive collection device have been discussed, dimensions can be tailored to fit the desired application, including increasing the dimensions to create a larger device.

Both the body and the guard are typically milled from aluminum stock. Aluminum was chosen because it provides a lightweight, easily formed material which is resistant to heat and radiation. The aluminum is also sturdy to withstand any impacts which could occur in the industrial setting. It should be understood, however, that while aluminum is preferred, any material may be used that meets the requirement of the process environment into which the device 10 is placed. The material chosen preferably should be able to withstand the chemicals used in the process so that "galling" of the device does not occur as the device 10 actuates. In other words, the device 10 should preferably be constructed so as to prevent particles of the material comprising the device 10 from sloughing off due to wearing and affecting the overall process or the actuation and operation of the device 10. Protective coatings such as anodizing or teflon may be optionally used to further protect the device 10 from the process environment.

The cavity 42 in the body 30 causes the body 30 to appear substantially "C" shaped. The legs of the "C" form first and second support legs 44A and 44B on either side of the cavity 42. Preferably, the cavity 42 is disposed so that the second leg 44B is thicker than the first leg 44A. In the most preferred embodiment, the first leg 44A extends 0.375 inch along the length of the body 30. The second leg 44B extends 1.375 inch along the length of the body 30. Support bores 46A and 46B are disposed through each support leg 44A and 44B and aligned axially. Preferably, support bore 46A has a diameter of approximately 0.75 inch and support bore 46B has a diameter of approximately 0.3125 inch. A longitudinal support shaft 50 is disposed through the support bores 46A and 46B so as to be supported by the support legs 44A and 44B. A set screw 48A and set screw aperture 48B are preferably disposed through the first support leg 44A to fix the position of the longitudinal support shaft 50 in place relative to the body 10, although a person skilled in the art would realize that other methods may be used to prevent the longitudinal support shaft from being withdrawn from the support bores 46A and 46B. A transparent tube 52 (preferably quartz), a compression spring 54, the shutter 32 and the fiber optic mount 36 are disposed coaxially about the support shaft 50. While the transparent tube 52 is preferably quartz, any radiation-transmissive material which can withstand the process environmental conditions may be used. The fiber optic mount 36 is secured to the support shaft 50 by set screws 36A disposed through threaded apertures 36B in the fiber optic mount 36. The fiber optic cable 28 is then secured to the fiber optic mount 36 in a manner known to those skilled in the art.

Figure 4:
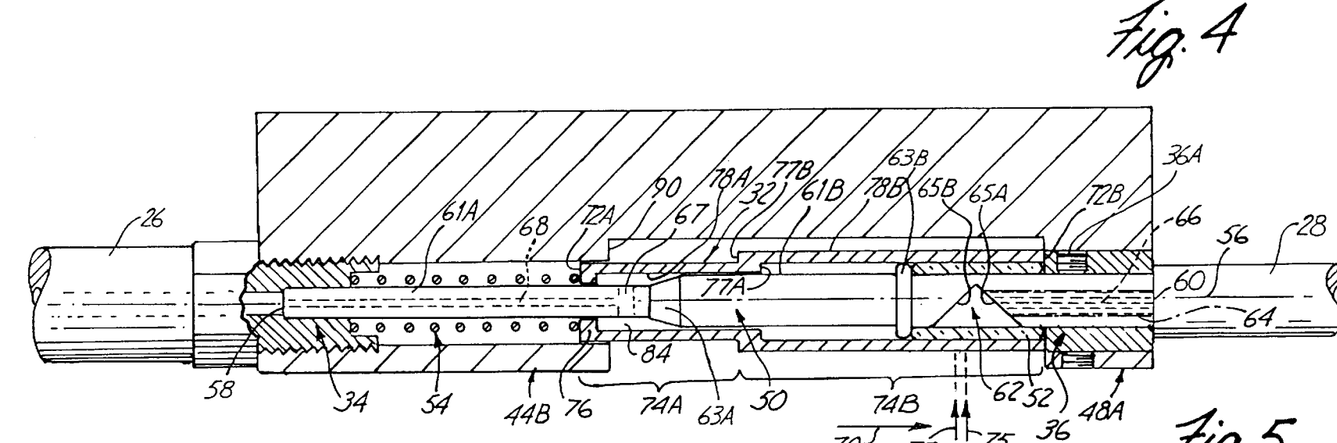
FIG. 4 is a longitudinal sectional view of the inventive energy collection device showing the shuttle disposed in the "closed" position.
Figure 5:
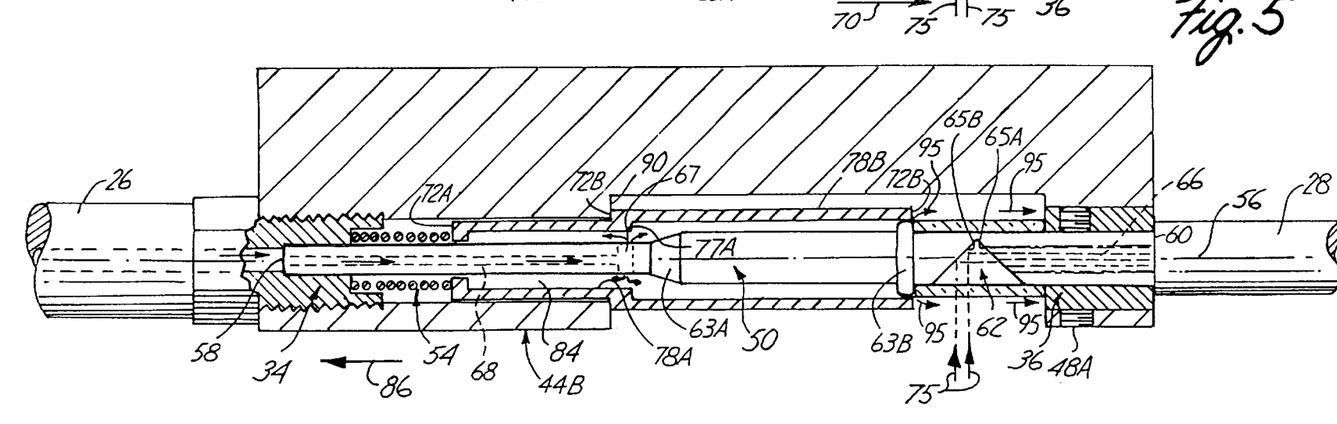
FIG. 5 is a longitudinal sectional view of the inventive energy collection device with the shuttle disposed in the "open" position.

The pneumatic fitting 34 is of a type known to those skilled in the art. Preferably, the pneumatic fitting 34 is threaded into bore 46B in the second support leg 44B. Once assembled, the first end 58 of the support shaft 50 is disposed inside the pneumatic fitting (as best shown in FIGS. 4 and 5).

Figure 3A:
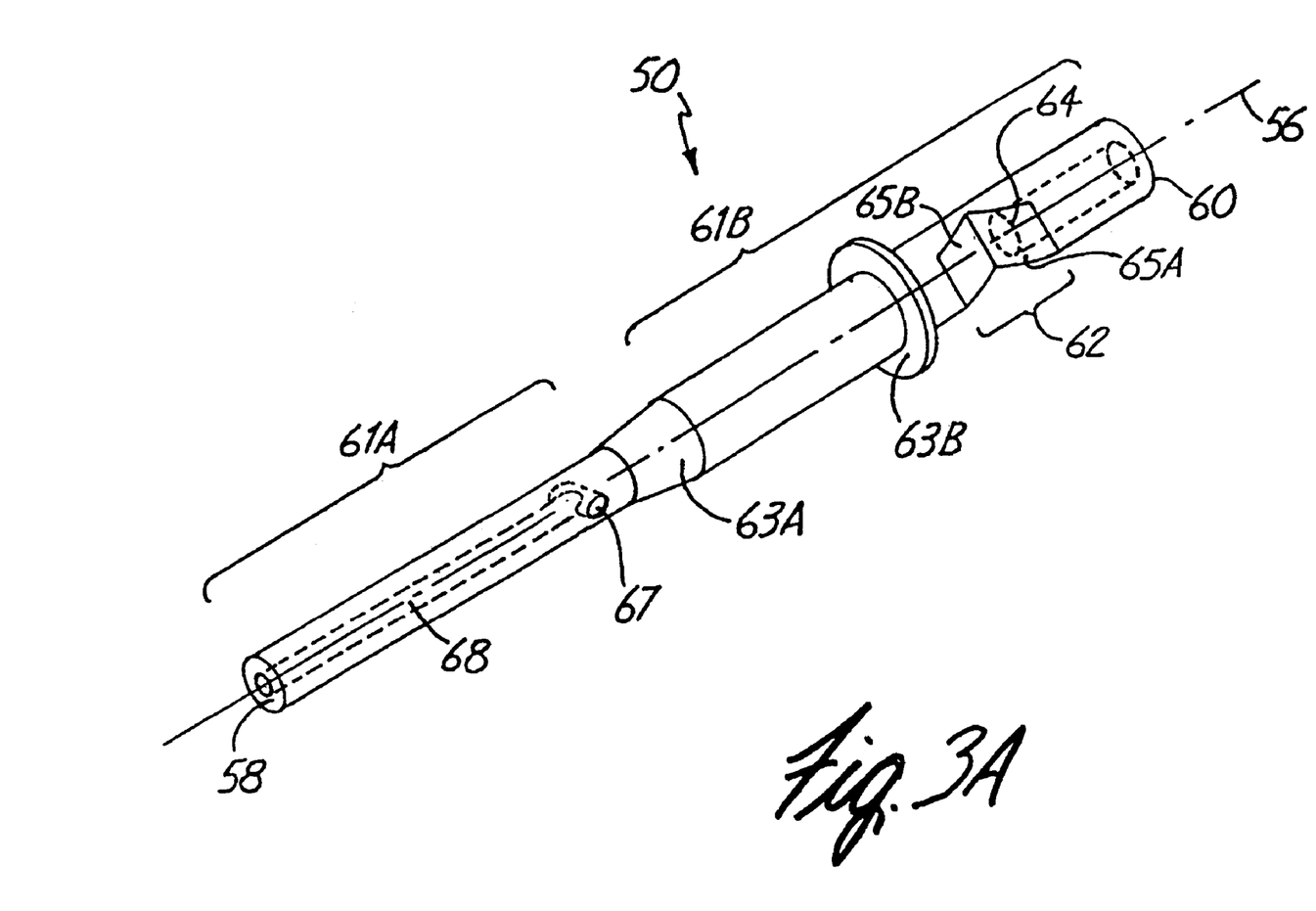
FIG. 3A is an enlarged perspective view of the longitudinal support shaft of the inventive energy collection device.

As shown in FIG. 3A, the support shaft 50 has a longitudinal axis 56, a first end 58 and a second end 60. Preferably, the support shaft 50 increases in diameter along its length. Preferably, the maximum length of the support shaft 50 is approximately 3.125 inches from the first end 58 to the second end 60. From the first end 58, a first diameter 61A extends approximately one-half of the way (preferably approximately 1.375 inch) along the support shaft 50. A second larger diameter 61B extends from an enlarged shoulder 63A and continues the remaining length of the support shaft 50 (preferably approximately 1.75 inch) to the second end 60. The shoulder 63A defines the transition from the first diameter portion 61A to the second diameter portion 61B. While it would be obvious to one skilled in the art that this shoulder 63A could be at a right angle to the longitudinal axis 56, it preferably forms an angle of less than ninety degrees to the longitudinal axis 56. A collection aperture 62 is disposed in the support shaft 50 proximate the second end 60 in the second diameter portion 61B. A fiber optic bore 64 extends from the second end 60 of the support shaft 50 along the longitudinal axis 56 of the support shaft 50 so as to be in communication with the collection aperture 62. By loosening the set screw 48A (shown in FIG. 3) which maintains the support shaft 50 in the body 30, the support shaft 50 can be rotated about its longitudinal axis 56 so that the collection aperture 62 faces the lamp 12 (see FIG. 1), regardless of how the body 30 is mounted. In the preferred embodiment, the support shaft 50 can be rotated approximately 320 degrees.

As shown in FIG. 3A, the collection aperture 62 preferably has first and second reflective sides 65A and 65B angled at approximately a forty-five degree angle to the longitudinal axis 56 so as to receive photons of radiation (e.g., energy) which enter the collection aperture 62. The reflective side 65B directs the energy so that it is traveling parallel to the longitudinal axis 56 of the support shaft 50. The fiber optic bore 64 extends through the first reflective side 65A so as to be in communication with the collection aperture 62. The second reflective side 65B directs energy towards the fiber optic bore 64 (described further with respect to FIG. 5). The reflective sides 65A and 65B are disposed at forty-five degree angles to the longitudinal axis 56 due to ease of manufacture. It should be noted that other angles may be used without departing from the scope of the invention. For example, reflective side 65A may be disposed at a ninety degree angle to the longitudinal axis 56 while maintaining reflective side 65B at a forty-five degree angle. A person skilled in the art would realize that the angles for each side may be independently varied between zero and ninety degrees (to longitudinal axis 56) according to the desired level of energy detection.

The longitudinal support shaft 50 is preferably formed of aluminum (although other materials may be used). As described previously, aluminum is lightweight and resistive to hostile industrial conditions particularly radiation and heat. Additionally, the aluminum can be easily polished to permit high reflection of radiation photons, eliminating the need for inlaying or coating a second reflective material into the sides 65 of the collection aperture 62. Although in the preferred embodiment, both first and second reflective sides 65A and 65B are polished to provide a reflective surface (due to ease of manufacture), it is only necessary for the second reflective side 65B to provide a reflective surface in order for the device 10 to operate. Additionally, the sides 65A and 65B may be varied in reflectiveness according to the desired collection characteristics of the device 10. For example, a teflon coating (or other similar coating) may be applied to one or both reflective sides 65A and 65B to create a diffuse surface (as known to those skilled in the art), once again allowing the collection characteristics of the device 10 (e.g., specular reflector versus diffuse reflector) be optimized according to the specific process being monitored.

An annular ring 63B is formed about the longitudinal support shaft 50 approximately midway along the length of the second diameter portion 61B (preferably approximately 0.75 inch from the second end 60). The ring 63B is disposed coaxially to the support shaft 50, between the shoulder 63A and the collection aperture 62, proximate to the collection aperture 62. One or more exhaust apertures 67 are disposed approximately midway along the length of the longitudinal support shaft 50 (preferably approximately 1.25 inches from the first end 58 of the support shaft 50) in the first diameter portion 61A, proximate to the shoulder 63A. A pressure bore 68 extends along the longitudinal axis 56 of the support shaft 50 from the first end 58 of the support shaft 50 to the exhaust apertures 67 and is in communication with the exhaust apertures 67 and with the gas line 26 via the pneumatic fitting 34.

As shown in FIG. 4, fiber optic elements 66 are directed through the fiber optic bore 64 into the collection aperture 62 so as to receive the radiation impinging on the collection aperture 62. Thus, the fiber optic cable 28, the fiber optic mount 36 and the collection aperture 62 are all in radiant communication. It should be noted that for clarity, the energy collection device 10 is illustrated and described without the optional guard 38 described with respect to FIGS. 2 and 3. The fiber optic mount 36 is attached coaxially about the support shaft 50 between the first end 58 and the collection aperture 62 by set screws 36A. The transparent tube 52 (or quartz or transparent shield) is disposed about the support shaft 50 proximate to the first end 58 of the support shaft 50 and is retained in position between the annular ring 63B on the support shaft 50 and the fiber optic mount 36. Thus, the quartz tube 52 is disposed so as to enclose the collection aperture 62. The quartz tube 52 acts to prevent foreign objects in the environment surrounding the light collection device 10 from entering the collection aperture 62. This protective measure helps to prevent damage to the fiber optic elements 66 which extend into the collection aperture 62. It should be noted that although the collector 62 is preferably shaped as described, other collector shapes (e.g., fiber optic elements 66 directed so as to extend normal to the longitudinal axis 56 of the support shaft 50) may be employed without departing from the spirit or scope of the invention.

The shutter 32 is slidably disposed about the support shaft 50 between the compression spring 54 and the fiber optic mount 36. The shutter 32 includes a first end 72A and a second end 72B. The shutter 32 has a first diameter portion 74A and a second diameter portion 74B (see FIG. 4). The first diameter portion 74A extends from the first end 72A to a point approximately one-third of the way along the longitudinal length of the shutter 32 (preferably approximately 0.625 inch). The second diameter portion 74B extends the remaining longitudinal length (preferably approximately 1.125 inches) of the shutter 32 to the second end 72B of the shutter 32. The transition from the first diameter 74A to the second diameter 74B creates an inner shoulder 77A annularly about an interior wall 78A of the shutter 32. The inner shoulder 77A extends radially outward from the first diameter portion 74A to the second diameter portion 74B. The transition also creates an outer shoulder 77B annularly about an exterior wall 78B of the shutter 32. The outer shoulder 77B extends radially outward from the first diameter portion 74A to the second diameter portion 74B. The first end 58 of the longitudinal support shaft 50 is disposed in the pneumatic fitting 34 such that the pressure bore 68 is in communication with a fitting aperture 34A in the pneumatic fitting 34. The compression spring 54 is disposed coaxially about the longitudinal support shaft 50 proximate to the first end 58 of the support shaft 50, between a spring socket 34B in the pneumatic fitting 34 and the first end 72A of the shutter 32.

The compression spring 54 biases the shutter 32 towards the second end 60 of the support shaft 50 in the direction of arrow 70 (FIG. 4) until the second end 72B of the shutter 32 engages the fiber optic mount 36. The compression spring 54 provides the biasing force to the shutter 32 by being compressed between the shutter's first end 72A and the pneumatic fitting 34. While the preferred embodiment of the invention utilizes a spring, other biasing devices (or forces) known in the art may alternately be used (e.g., elastomeric elements or magnetic couplings). The shutter 32 is thus disposed in a first closed position over the collection aperture 62, thereby preventing photons 75 of radiant energy from entering the collection aperture 62. As is illustrated, the shutter first end 72A includes an annular lip 76 which is sealably engaged with the support shaft first diameter portion 61A. Although sealably engaged with the first diameter portion 61A, the annular lip 76 is able to slide with respect to the support shaft 50. This sliding function may be enhanced by, for example, applying a teflon coating (or hardcoat), to the surface of the first diameter portion 61A of the support shaft 50 (or on the annular lip 76). The teflon coating also helps to prevent the generation of particles from the device 10 (or "galling") which can affect the process as well as the operation of the device 10. By assuring that wear of the device 10 is minimal, the device 10 becomes a "permanent" part of the process. In other words, the device 10 typically will not need to be replaced during the lifetime of the manufacturing line.

The interior wall 78A of the first diameter portion 74A of the shutter 32 is in close tolerance with the support shaft second diameter portion 61B (see FIG. 4). The annular ring 63B is slidably engaged with the interior wall 78A of the shutter 32 along the second diameter portion 74B of the shutter 32. Once again, the sliding between the two surfaces may be enhanced by applying a teflon coating either to the surface of the second diameter portion 61B of the support shaft or the annular ring 63B. A compression chamber (or pressure chamber) 84 is formed between the annular lip 76 of the shutter 32 and the annular ring 63B of the support shaft 50. When compressed nitrogen (or any pressurized gas) is forced through the gas line 26, pressurized nitrogen exits the exhaust aperture 67 and enters the compression chamber 84. The compressed gas is trapped between the support shaft 50 (along part of the first diameter portion 61A) the annular lip 76 of the shutter 32, the first shoulder 63A of the support shaft 50, and the inner wall 78A of the shutter first diameter portion 74A. Together these boundaries form the compression chamber 84. As the pressure inside the compression chamber 84 builds, the biasing force of the compression spring 54 is overcome.

As shown in FIG. 5, the increased pressure drives the shutter 32 towards the first end 58 of the support shaft 50 in the direction of arrow 86 (FIG. 5), overcoming the bias force of the spring 54. The shutter 32 is driven towards the first end 58 of the longitudinal support shaft 50 until the outer shoulder 77B of the shutter 32 engages a stop face 90 on the second support 44B. The stop face 90 is formed on the second support 44B proximate the cavity 42 and extends around the support bore 46B. When the outer shoulder 77B engages the stop face 90, the shutter 32 is prevented from moving any further in the direction of arrow 86. The energy collection device 10 is then placed in a second "open" position. In the second "open" position, the light photons 75 are able to travel through the quartz tube 52 and into the collection aperture 62 so as to impinge upon the fiber optic elements 66. The radiant energy is then transmitted through the fiber optic cable 28 to a remote detection unit (not shown) for recording and analysis.

As the shutter 32 is moved towards the first end 58 of the longitudinal support shaft 50, the shutter inner shoulder 77A is moved over the first diameter portion 61A of the support shaft 50. Once the inner shoulder 77A moves past the shaft shoulder 63A, the interior wall 78A of the first diameter portion 74A of the shutter 32 is no longer sealably engaged with the second diameter portion 61B of the support shaft 50. When the outer shoulder 77B of the shutter 32 engages the stop face 90 of the body 30, the first diameter portion 74A of the shutter 32 is disposed about the first diameter portion 61A of the support shaft 50. The second diameter portion 74B of the shutter 32 is disposed substantially about the second diameter portion 61B of the support shaft 50. The extent of the compression chamber 84 is expanded by such relative movement so that the chamber 84 is now defined by the annular lip 76 of the shutter 32, the inner wall 78A of the shutter 32 (along both the first and the second diameter portions 74A and 74B), the annular ring 63B and the support shaft 50 (along part of the first diameter portion 61A and the second diameter portion 61B). As mentioned previously, the annular ring 63B of the longitudinal support shaft 50 is slidably engaged with the interior wall 78A of the shutter 32 along the second diameter portion 74B of the shutter 32.

Preferably, the annular interface between the interior wall 78A of the shutter 32 and the annular ring 63B has a tolerance such that a small amount of compressed gas is allowed to leak out of the compression chamber 84 at this interface. The leaking of the pressurized gas creates a gas curtain which extends coaxially along the support shaft 50 towards the second end 60 of the support shaft 50 (in direction of arrows 95 in FIG. 5). This gas curtain is directed over the quartz tube 52 and acts to prevent foreign objects (including vapors from the process) from impinging upon the quartz tube 52 when the shutter is in the second "open" position by blowing them away. By creating such a gas curtain, the effectiveness of the energy collection device 10 is increased since the gas curtain acts to dislodge particles and prevent them from adhering to the quartz tube 52. Thus, the gas curtain inhibits build up which could cloud the quartz tube 52 over time and prevent the energy collection device 10 from taking accurate measurements of the energy photons 75. The gas curtain thereby helps to reduce maintenance of the device 10 and reduces the likelihood that the device 10 will need to be replaced, making it a permanent part of the system (discussed previously).

Upon a predetermined amount of time passing, (typically dictated by a computerized controller, not shown), the compression chamber 84 is depressurized, and the compression spring 54 once again biases the shutter 32 into the first "closed" position (see FIG. 4). Preferably, a low level of pressurization is provided to the device (below the biasing force of the spring 54) so that even in the "closed" position, the tolerances of the device 10 allow the positive pressure internal to the device 10 to very slowly leak out of the device 10. By allowing for gas to escape between the interfaces of the device components, foreign objects are prevented from entering the device. In particular, this prevents the shutter 32 from "sticking" as the device is actuated.

In this fashion, multiple measurements can be taken of the energy photons 75 without undue stress on the energy collection device 10, either through fogging of the quartz tube 52 or degradation of the fiber optic elements 66. Since no electronic components are involved in the energy collection device 10, the level of environmental hostility surrounding the energy collection device 10 (e.g., heat, radiation, humidity, etc.) does not affect the operation of the energy collection device 10. Additionally, the relatively few moving parts allow the energy collection device 10 to be smaller and less obtrusive than known prior art collection devices. The small overall size allows the device 10 to be placed in environments that were not previously accessible. All of these benefits provide the opportunity to place the energy collection device 10 in a position where a direct measurement can be taken of the radiation photons 75 directly affecting the drying process (in other words, the inventive radiation collection device "sees" the same radiant energy output as the advancing web). More accurate measurements allow for better control of the process, less loss product, and increased economic return.

Although the present invention has been described with reference to preferred embodiments, workers skilled in the art will recognize that changes may be made in form and detail without departing from the spirit and scope of the invention.

What is claimed is:

1. An energy collection device comprising:
    a support having an energy collector;
    a shutter slidably attached to the support, the shutter being moveable between a first position and a second position, wherein in the first position the shutter covers the collector and in the second position the shutter does not cover the collector, wherein the shutter is biased into one of the positions;
    a chamber disposed proximate to the shutter such that introducing pressurized gas in the chamber overcomes the bias and moves the shutter into an opposing position; and wherein the energy collection device has at least one overall dimension of less than about ⅝ of an inch.

2. The device of claim 1 further comprising:
    a spring disposed between the shutter and the support so as to bias the shutter into the first position.

3. The device of claim 1, and further comprising:
    a mounting body having a first leg and a second leg, wherein the support is fixably mounted to the first leg and the second leg.

4. The device of claim 3 wherein a first bore extends through the first leg and a second bore extends through the second leg and wherein the support is disposed through the first and second bores.

5. The device of claim 4 wherein the support is rotatably positionable within the first and second bores.

6. The device of claim 3, and further comprising:

a positionable guard attached to the mounting body.

7. The device of claim 3 wherein the support is formed from aluminum.

8. The device of claim 1 wherein the support further includes a first end, a second end, a longitudinal axis extending from the first end to the second end, a fiber optic bore extending along the longitudinal axis from the second end to the collector, an exhaust aperture and a pressure bore extending along the longitudinal axis from the first end to the exhaust aperture.

9. The device of claim 8 wherein the collector further comprises:

a first sidewall inclined at an angle of about 45 degrees relative to the longitudinal axis, wherein the fiber optic bore extends through the first sidewall; and a second sidewall inclined at an angle of about 45 degrees relative to the longitudinal axis, wherein energy striking the second sidewall is directed towards the fiber optic bore.

10. The device of claim 1, wherein the support includes a first end and a second end and further comprising:

a fiber optic mount secured to the second end.

11. The device of claim 1, wherein the support includes a first and a second end and further comprising:

a pneumatic fitting secured to the first end.

12. The device of claim 1, wherein the support includes a first end and a second end wherein the support is less than about 3 inches from the first end to the second end.

13. The device of claim 1 wherein the collector comprises: at least one reflective surface; and a radiation sensor, wherein the reflective surface directs energy photons impinging the collector towards the sensor.

14. The device of claim 1 wherein the collector comprises:

at least one diffuse surface; and a radiation sensor, wherein the diffuse surface directs energy photons impinging the collector towards the sensor.

15. The device of claim 1, and further comprising:

a radiation-transmissive cover mounted over the collector.

16. The device of claim 1 wherein the device has an aperture for diverting pressurized gas over the collector.

17. The device of claim 1 wherein the device has maximum overall dimensions of about 4.25 inches by 1.25 inches by 0.625 inch.

18. An energy collection device comprising:

a mounting body having a first support and a second support;

a longitudinal support shaft having a first end disposed in the first support and a second end disposed in the second support, the first end including a pressure bore and the second end including a collector;

an exhaust aperture disposed in the support between the collector and the first end;

a pneumatic fitting disposed about the first end of the longitudinal support shaft and in communication with the exhaust aperture;

a fiber optic mount secured to the second end of the longitudinal support shaft in radiant communication with the collector;

a shutter disposed about the longitudinal support shaft between the exhaust aperture and the fiber optic mount; and a spring disposed about the longitudinal support shaft between the shutter and the pneumatic fitting such that the spring biases the shutter toward a position covering the collector, wherein compressed gas is introduced into the pressure bore, the gas is forced out of the exhaust aperture against the shutter, overcoming the spring bias and translating the shutter along the longitudinal support shaft so as to uncover the collector.

19. The device of claim 18, and further comprising:

a transparent shield mounted over the collector.

20. The device of claim 19 wherein a curtain of compressed gas is directed across the transparent shield.

21. A method for collecting radiant energy emitted from an ultraviolet lamp towards a streaming web comprising:

disposing a collector between the streaming web and the ultraviolet lamp;

biasing a shutter into a first position covering the collector such that no radiant energy can reach the collector; and translating the shutter into a second position using pneumatic pressure such that the shutter uncovers the collector, allowing radiant energy to reach on the collector.

22. The method of claim 21, further comprising:

directing a curtain of air over the collector while the shutter is in the second position.

23. An energy collection device comprising:

a support having an energy collector;

a shutter slidably attached to the support, the shutter being moveable between a first position and a second position, wherein in the first position the shutter covers the collector and in the second position the shutter does not cover the collector, wherein the shutter is biased into one of the positions;

a chamber disposed proximate to the shutter such that introducing pressurized gas in the chamber overcomes the bias and moves the shutter into an opposing position, and wherein small amounts of pressurized gas are allowed to leak out of the chamber at all times; and wherein the energy collection device has at least one overall dimension of less than about 5/8 of an inch.

* * * * *